Sept. 30, 1969　　　　SHIGEO IWATA　　　　3,469,455
APPARATUS FOR MEASURING CHANGES IN THE WEIGHT OF A SAMPLE
Filed April 7, 1967　　　　　　　　　　　　　　2 Sheets-Sheet 2

INVENTOR
SHIGEO IWATA
BY
Morgan, Finnegan, Durham & Pine
ATTORNEYS

United States Patent Office 3,469,455
Patented Sept. 30, 1969

3,469,455
APPARATUS FOR MEASURING CHANGES IN THE WEIGHT OF A SAMPLE
Shigeo Iwata, Kyoto, Japan, assignor to Chyo Balance Corporation, Kyoto, Japan, a corporation of Japan
Filed Apr. 7, 1967, Ser. No. 629,192
Claims priority, application Japan, Apr. 12, 1966, 41/23,052; Dec. 24, 1966, 41/84,628; Dec. 27, 1966, 42/78
Int. Cl. G01d *21/00*
U.S. Cl. 73—432    13 Claims

ABSTRACT OF THE DISCLOSURE

Apparatus for measuring changes in the weight of a sample in which the sample container is supported at the outer end of an elongated support bar laterally extending from a sample loading member included in a weighing mechanism, the support bar being covered by a tube through which a fluid flows, so that the weighing mechanism can be prevented from being affected by the conditions and atmospheres in which the sample is placed.

This invention relates to apparatus for measuring changes in the weight of a sample which is placed in various conditions and atmospheres.

The measurement of any change in the weight of a smaple is usually carried out through the utilization of a balance. The sample with which a balance is loaded is subjected to a particular condition or atmosphere to cause a change in the weight of the sample. However, the measured values obtained with conventional devices are not reliable because various portions of the balance are influenced by the condition or atmosphere as well as the sample is influenced. For example, in a case where the sample is placed in a fluid flowing with a high speed, hydrodynamic forces act on the balance beam and other related members participating in the weighing operation, and where a corrosive fluid is used, various members of the balance are corroded to such an extent as to induce disorder in its measuring functions. These phenomena result in errors in the measurement.

The primary object of the invention is, therefore, to provide an improved apparatus for measuring changes in the weight of a sample with a high accuracy in which the substantial portion of the weighing mechanism can be protected from being influenced by the particular condition or atmosphere in which the sample is placed to be physically or chemically changed.

Another object of the invention is to provide an improved apparatus for measuring changes in the weight of a sample which is placed in a fluid flow, without the weighing mechanism being affected by any physical and chemical actions of the fluid flow.

A further object of the invention is to provide an improved apparatus for measuring changes in the weight of a sample in which the weighing mechanism is not contaminated by the sample running over the container.

A still further object of the invention is to provide an improved apparatus for measuring any changes in the weight of a sample which is subjected to contact with a reactive fluid, in which the reactive fluid is prevented from entering into the casing enclosing a substantial portion of the weighing mechanism.

Another object of the invention is to provide an improved radiation thermo-balance in which means for applying radiation to the sample and means for detecting radiation from the sample can be arranged without difficulties and the weighing mechanism can be prevented from various inconveniences which might be caused by the arrangement of such means and the actions involved with radiation to the sample.

A still further object of the invention is to provide an improved arrangement of a plurality of sample containers in a fluid flowing tube so that the two sample containers may be equally affected by the atmosphere.

Apparatus according to the invention comprises a known weighing mechanism including a sample loading member and means for counterbalancing the sample load. Typically, such a weighing mechanism is a balance with weights, but any other weighing devices such as coiled spring balances and torsion balances may be utilized. The weighing mechanism is enclosed in the casing so as to be prevented from being affected by the outside atmosphere. According to the invention, an elongated support bar is attached to the sample loading member of the weighing mechanism. The support bar is made of a rigid material and extends laterally from the sample loading member in the direction substantially perpendicular to the direction of the load to be measured in the weighing mechanism. At the outer end of the support bar at least one sample container is supported. The support bar with the sample container is covered by a tube laterally extending from the casing enclosing the weighing mechanism.

The weighing operation in the weighing mechanism may, preferably, be carried out by a zero method so that the support bar with a sample container is always maintained on the central axis of the tube covering the support bar.

Apparatus according to the invention may also include means for applying to a sample in the sample container a physcial or chemical action which causes changes in the weight of the sample. Such means may be a device for heating or cooling the sample. A heating device such as an electric furnace or a cooling device including a refrigerant passageway may be arranged so as to surround the portion of the tube covering the sample container.

Through the tube covering the support bar with the sample container a fluid may flow so as to be in contact with the sample supported by the sample container. The fluid flowing through the tube is usually a gas but it may be a liquid. The fluid may be either a carrier which is not reactive with the sample or a gas or lquid which is reactive with the sample.

It is preferable to flow such the fluid in a direction toward the outer end of the tube. For this purpose, means for supplying a suction may be connected to the outer end of the tube. The inlet for the fluid may be connected at a position near the joint of the tube to the casing enclosing the weighing mechanism. The inlet may be formed in such manner as to have a plurality of openings which are arranged in a circle surrounding the support bar and are open in directions toward the sample container and the outer end of the tube.

The fluid which should contact the sample may also flow from the outer end of the tube toward the casing for the weighing mechanism. In such a case, in order to prevent the fluid, which may be reactive with the sample, from entering into the casing for the weighing mechanism, an outlet is connected to the tube at a position near the joint of the tube to the casing, and another fluid which is not reactive with the sample is introduced from the casing into the tube. The mixture of the two fluids introduced from the opposite ends of the tube is discharged through the outlet near the joint of the tube to the casing for the weighing mechanism. The casing may have a nozzle through which a fluid non-reactive with the sample is introduced from the casing into the tube. The support bar extends through the nozzle. The nozzle has a smaller diameter than the tube and extends into the tube for a length beyond the above mentioned outlet.

The invention may be applied to a radiation thermobalance. In such a case, means for applying radiation to the sample and means for detecting radiation from the sample are arranged at the opposite sides with respect to the sample supported by the sample container.

According to the invention, a plurality of sample containers may be arranged in the tube at the outer end of the support bar. The two or more sample containers are arranged in a plane perpendicular to the length of the tube so that they may be equally influenced by the fluid flowing through the tube. Preferably, the tube is formed in an elliptical section and a pair of sample containers are arranged at the focuses of the ellipse, respectively. In this manner any heat from the wall of the tube can be converged effectively and equally to the sample placed in the tube. Either one of the sample containers may be used as a container for a reference material. This modification of the invention finds its usefulness particularly in differential thermal analysis. For differential thermal analysis, it would be preferable to provide the sample containers with thermocouples to detect the difference in the temperature between the sample and the reference material in the two containers. Provision of a thermocouple is useful not only for differential thermal analysis but also for observing any change in the temperature of the sample in any other analysis.

Other features and advantages of the invention will become apparent from the following detailed description in conjunction with the accompanying drawings in which.

Figure 1:
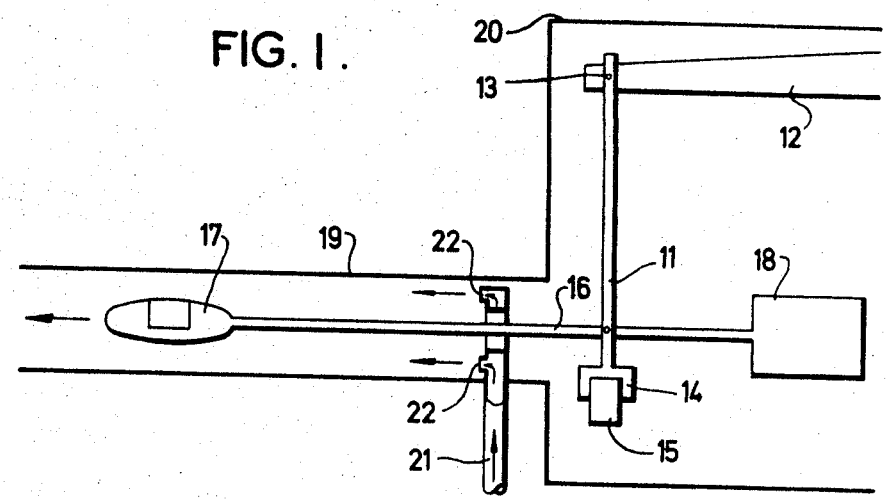
FIG. 1 is a schematic view of apparatus according to the invention in which the weighing mechanism is partly cut off.

Referring to the drawings, FIG. 1 illustrates apparatus according to the invention, in which a balance is used for detection of weight, but showing only half of the balance on the sample side. A sample loading member 11 in the form of a straight bar is suspended from a balance beam 12 at the force acting point 13 thereon and has a brake plate 14 secured to the lower end thereof and held in a free state at the middle of a magnet 15. A support bar 16 is fixed to the sample loading member 11 so as to cross it at right angles and at a location above the brake plate 14. Secured to the outer end of the support bar 16 is a sample container 17 in the form of a streamlined body extending in the direction of an extension of the support bar 16, while a counter weight 18 is secured to the opposite end so as to balance with the sample vessel 17. Though not shown, suitable means for counterbalancing the load applied to the member 11 such as a weight scale on the opposite end of the beam 12 is provided. It should also be noted that the weighing operation with the mechanism enclosed in the casing 20 is carried out by a zero or null method, which is known per se.

A fluid conduit, indicated at 19, surrounds the support bar 16 and sample container 17 so that the elements 16 and 17 may be positioned on the central axis of the fluid conduit 19. One end of the fluid conduit 19 is connected to a casing 20 enclosing the balancing mechanism and the other end is open to the exterior atmosphere at a suitable distance from the sample container 17. A fluid injecting tube 21 is attached at a suitable distance from the sample container 17 toward the balance casing 20. This injection tube 21 communicates through an injection pump with a source of liquid which is intended to provide a weight change to the sample. The injection tube 21 extends through the wall of the conduit 19 into the interior thereof and has a plurality of openings 22 which are arranged in a circle surrounding the support bar 16 and are open in directions toward the sample container 17. Thus, the fluid is jetted through the openings 22 in the conduit 19 toward the sample container 17, the flow being regulated while the fluid is flowing to the sample container in parallel to the support bar 16, passed in contact with the lateral surface of the sample container 17 in the form of a streamlined body and finally discharged to the open atmosphere, without any possibility of the fluid flowing into the balance mechanism in the casing 20 or the possibility that the fluid has such a hydrodynamic effect on the balance casing 20 as will influence measured values.

As explained above, according to the present invention, since fluids which are intended to cause changes in the weight of samples cannot flow into the casing for the balance mechanism, there is no danger of causing expansion and contraction to the weighing operation parts of the balance or of corroding the same in the case where the effects of the temperature or corrosive nature of fluids with respect to a sample are investigated. And in the case of flowing fluids at high speed, there is no danger of the fluids producing such an active force on the sample container as will influence measured values, so that it is possible to achieve a dependable measurement of weight changes. In addition, since the sample container is remote from the location of the weighing operation mechanism of the balance, even if the sample overflows during measurement due to foaming or the like or the sample spills during handling, weight change measurement can be continued without hindrance, as the only contamination is in the conduit 19. Thus, the substantial weighing mechanism can be prevented from contamination even where the sample runs over the sample container.

Figure 2:
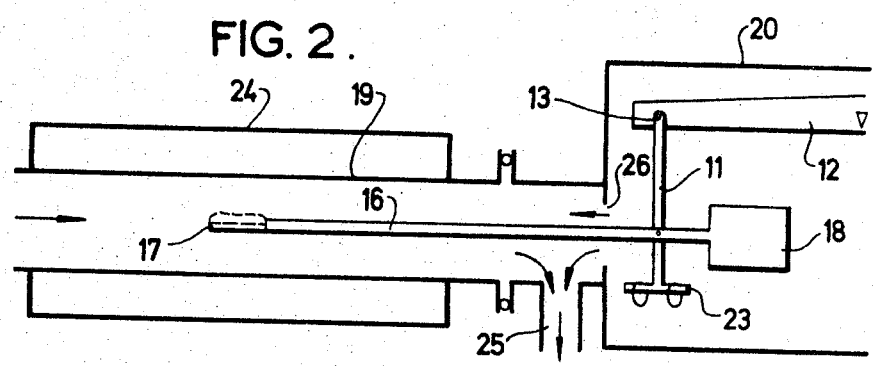
FIG. 2 is a schematic view similar to FIG. 1 of another embodiment of the invention.
Figure 3:
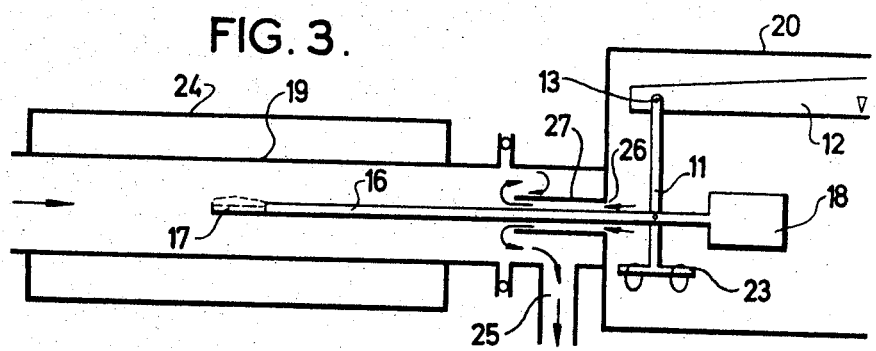
FIG. 3 is a schematic view similar to FIG. 1 of a further embodiment of the invention.

FIGS. 2 and 3 illustrate two other embodiments of the invention. In each of FIGS. 2 and 3, only about half the balance mechanism is shown. A sample loading member 11 is suspended from one end 13 of a balance beam 12 and has a weight pan arrangement 23 attached to the lower end thereof. The other end of the beam 12 is loaded with a balance weight. This type of balance is known as the so-called "sensitivity constant balance." A support bar 16 is fixed thereto at right angles to the sample loading member 11 and above the weight pan arrangement 23, a sample container 17 being attached to the outer or distal end of the support bar 16 and a counter weight 18 being attached to the inner or proximal end to maintain the support bar system in equilibrium. The reference numeral 19 designates a furnace tube installed in the interior of a furnace 24. The support bar 16 and sample container 17 are located on the center line of the furnace tube 19, the inner end of the latter being connected to the balance casing 20 and the outer end being open to the exterior atmosphere at a suitable distance from the sample container 17. Further, a fluid discharge opening 25 is provided at a suitable position near the joint of the tube 19 to the balance casing 20.

In the region of the balance casing 20 defined by the connection thereof with the furnace tube 19, there is provided a fluid port 26 surrounding the support bar 16.

A reactive fluid (mostly a gas) is supplied from a supply means positioned outside through the furnace tube 19 for contact reaction with a sample (illustrated in dotted lines) on or in the container 17, the sample container is positioned in the center of the furnace and the support bar 16 is free from restraint by any external means. At this state, in order to prevent the entry of the reactive fluid into the balance casing 20, the latter is filled with an inert protective fluid which is constantly flowing into the furnace tube 19 through the port 26 and is finally discharged through the discharge opening 25 along with the reactive fluid. In case that the reactive fluid is one which will not influence the balance, it is not necessary to supply the balance casing 20 with inert fluid. As mentioned above, according to the invention, the fluid reactive with the sample is prevented from influencing the measuring functions of various members within the balance casing 20 and also in the case of the fluid flowing at high speed it cannot influence the measured values, so that a dependable measurement of weight changes is assured.

In the embodiment illustrated in FIG. 3, the casing 20 has a nozzle 27 through which a fluid non-reactive with the sample is introduced from the casing 20 into the tube 19. The support bar 16 extends through the nozzle 27. The nozzle has a smaller diameter than the tube 19 and extends into the tube for a length beyond the discharge port 25. In this manner, it becomes possible to effectively prevent the reactive gas from flowing into the casing 20.

The invention also may be applied to radiation thermobalance.

Heretofore, the measurement of changes in mass and physical and chemical changes of a substance caused by the influence of radiations has been made in such a manner that a sample is vertically supported from the beam of a balance and radiation is applied thereto in the direction in which gravity acts. To this end, a large-sized radiation generator is installed in the upper or lower part of the balance, so that there are disadvantages in that the instrument becomes bulky as a whole and liable to impart vibrations to the balance and to be influenced by the flow of the atmosphere.

According to the invention, a sample is supported horizontally with respect to the balance and radiation is applied to the sample concurrently with measurement of changes in mass, in order to determine the physical and chemical properties of the sample. If a sample is supported horizontally from the balance, according to the invention, forces other than that exerted due to a change in mass will act normal to the direction in which gravity acts, so that there will be almost no influence of the flow of a gas. Because the sample is supported horizontally, there will be no hindrance in the direction normal to the support bar so that a radiation generator can be easily installed. Radiation is a general term for infrared rays, visible rays, ultraviolet rays, X-rays, γ-rays and other radiant rays. Heating means or cooling means is placed around the sample and a radiation-transmitting window is attached to a part thereof. Radiation is emitted from one side of the window and a receiving station is positioned on the side to which radiation is transmitted or diffracted. The intensity of radiation is converted into an electric signal at the receiving station and recorded on a recorder.

Changes in mass are measured by means of null method so that the position of a sample need not be moved. The displacement of the beam is optically or electromagnetically detected, while an electric current is kept flowing through a force balancing coil to constantly maintain the beam in equilibrium. If the current through the force balancing coil is passed through a recorder, changes in mass can be recorded at the same time.

As mentioned above, since the invention is capable of concurrently measuring the transmission or diffraction intensity and changes in mass due to physical or chemical changes of substances, it is an effective instrument for analysis of the structure of various substances.

Figure 4:
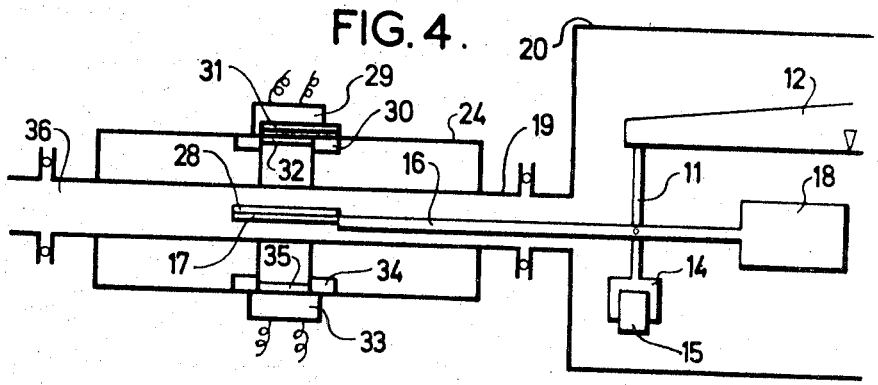
FIG. 4 is a schematic view similar to FIG. 1 of a still further embodiment of the invention.

FIG. 4 shows the principal portion of a radiation thermobalance embodying the invention, the right half of the balance mechanism being cut away. In FIG. 4 a sample loading member 11 is suspended from one end of a balance beam 12 and a sample vessel plate 17 is attached to the outer or distal end of a support bar 16 extending substantially at right angles to the loading direction and a counter weight 18 is attached to the inner or proximal end of the same so as to maintain horizontal equilibrium, said support bar 16 being fixedly secured to the loading member at a suitable position nearer the lower end thereof. A sample 28 is placed on the sample vessel plate 17 and positioned at the center of an electric furnace 24. With respect to vertical emission with the sample vessel plate 17 as the center, the electric furnace 24 is equipped with a light-casting station 29 having a water cooling cylinder 30 fitted with a filter 31 and a quarts window 32, and in opposed relation thereto, with a light-receiving station 33 having a water cooling cylinder 34 fitted with a quarts window 35. Radiation is transmitted through the filter 31 and the quarts window 32 to irradiate the sample 28 on the sample vessel plate 17 and thereafter through the quarts window 35 to reach the light-receiving station 33. The light-receiving station 33 is equipped with a phototube or photocell whereby the transmitted light is converted into an electric signal corresponding to its intensity. The electric signal is supplied to a recorder, so that the changes in the intensity of the transmitted light is continuously recorded as the changes in the properties thereof. At the outer end opening of the electric furnace 24, there is provided a conduit 36 connected to a gas suction means (not shown). The balance is enclosed in a balance casing 20.

An electromagnetic brake means 15 is provided at the lower projected end of the sample loading member 11 for restraining vibration. The deflection of the balance beam 12 caused by the change in mass is detected by a differential transformer provided within. The balance beam deflected is returned to its original position by a force balancing coil, the measurement being thus made by means of null method. These results of measurement are introduced into a recorder by means of electric currents and recorded as said changes in properties and also changes in mass.

Figure 5:
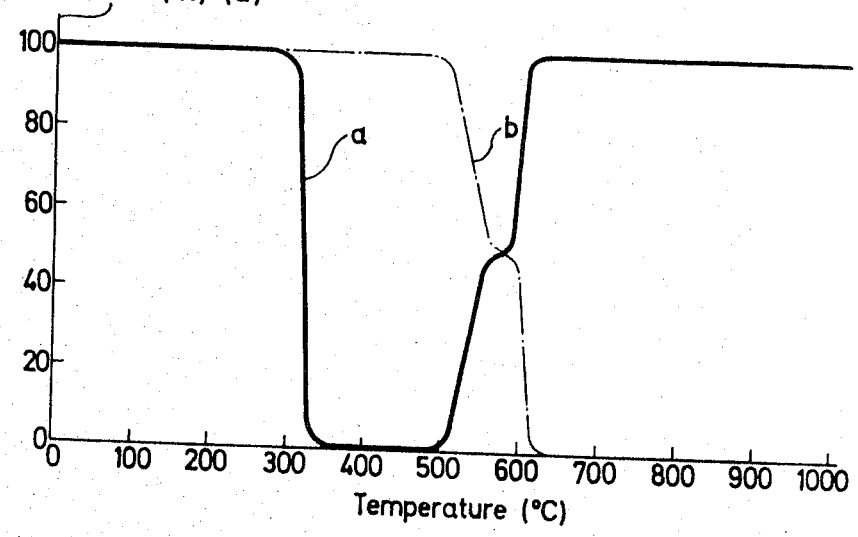
FIG. 5 is a diagram showing an example of the results of measurement obtained by using the apparatus illustrated in FIG. 4.

FIG. 5 is a diagram showing the results of the aforementioned measurement by way of example. In this example, visible rays are used and tetrafluoroethylene in the form of a transparent thin film is used as the sample. A tungsten-filament lamp is used as the source of light. The light is filtered by a filter to provide monochromatic light of 550 m$\mu$. The penetrating index begins to change at 250° C., the maximum change being reached at 323° C., opacity being obtained at 370° C. That is, in this process there is no change in mass. This change shows that crystalline high molecular material becomes amorphous. Starting at 480° C., the transparency is increased and through two steps the sample becomes opaque at 620° C. The change in mass in this time occurs by two steps and the sample disappears. That is, in this time, the high molecular material is decomposed to be completed gasified. The disappearance of the sample is believed to be responsible for the increase is transparency.

As mentioned above, the present invention provides a radiation thermobalance which is capable of readily and accurately measuring physical and chemical changes of matter without influencing any other articles than the sample and which is therefore put to extensive practical use as an important instrument.

Figure 6:
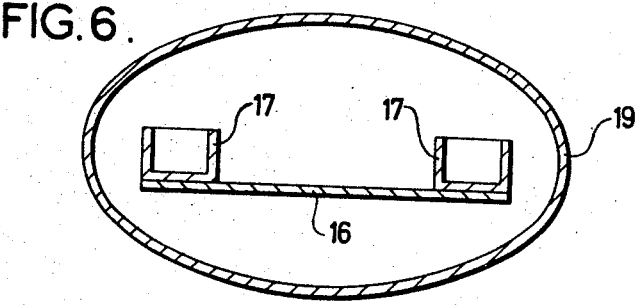
FIG. 6 is a sectional view of a modified arrangement of the sample containers in a furnace tube.

A plurality of sample containers may be arranged in the tube 19 at the outer end of the support bar 16 illustrated in each of FIGS. 1 to 4. The two or more sample containers should be arranged in a plane perpendicular to the length of the tube 19 so that they may be equally influenced by the fluid flowing through the tube 19. Preferably, the tube 19 is formed in an elliptical section as shown in FIG. 6 and a pair of sample containers 17 are arranged at the focuses of the ellipse, respectively. It will be understood that in this manner any heat from the wall of the tube 19 can be converged effectively and equally to the samples placed in the tube 19.

What I claim is:

1. Apparatus for measuring changes in the weight of a sample, comprising: a weighing mechanism including a sample loading member; a casing enclosing said weighing mechanism; an elongated support bar attached to said sample loading member and laterally extending from said sample loading member in a direction substantially perpendicular to the direction of the load to be measured in said weighing mechanism; at least one sample container for carrying said sample; supported by said support bar at its outer end remote from said weighing mechanism; a tube laterally extending from said casing so as to cover said support bar with said sample container; means causing a fluid reactive with said sample to flow into said tube; and further means preventing said fluid from contacting said weighing mechanism.

2. Apparatus for measuring changes in the weight of a sample as defined in claim 19, in which said weighing mechanism includes means for carrying out the weighing operation by a zero method.

3. Apparatus for measuring changes in the weight of a sample as defined in claim 1, wherein said fluid is caused to flow in a direction toward said outer end of said support bar.

4. Apparatus for measuring changes in the weight of a sample as defined in claim 3, wherein fluid inlet means is provided in said tube at a position intermediate said outer end of said support bar and said weighing mechanism, said fluid inlet means directing the flow of said fluid through said tube in a direction toward said outer end of said support bar.

5. Apparatus for measuring changes in the weight of a sample as defined in claim 4, in which said fluid inlet means has a plurality of openings which are arranged in a circle surrounding said support bar and open in a direction toward said outer end of said support bar.

6. Apparatus for measuring changes in the weight of a sample as defined in claim 1, wherein a plurality of sample containers are provided, said sample containers being mounted on said support bar in a plane perpendicular to the length of said tube.

7. Apparatus for measuring changes in the weight of a sample as defined in claim 6, wherein said tube is formed so as to have an elliptical section and a pair of sample containers are mounted on said support bar so as to be located at the respective focuses of said ellipse.

8. Apparatus for measuring changes in the weight of a sample as defined in claim 1, wherein said tube is provided with an outlet at a position intermediate said outer end of said support bar and said weighing mechanism, said fluid reactive with said sample in said sample container is caused to flow into said tube in a direction from said outer end of said support bar toward said outlet, and means causing a fluid which is not reactive with said sample in said sample container to flow from said casing into said tube, the mixture of the two fluids being discharged through said outlet.

9. Apparatus for measuring changes in the weight of a sample as defined in claim 8, in which said casing has a nozzle through which said support bar extends and said fluid non-reactive with said sample is introduced from said casing into said tube through said nozzle, said nozzle having a smaller diameter than said tube and extending into said tube for a length beyond said outlet.

10. Apparatus for measuring changes in the weight of a sample, comprising: a weighing mechanism including a sample loading member, a casing enclosing said weighing mechanism; an elongated support bar attached to said sample loading member and laterally extending from said sample loading member in a direction substantially perpendicular to the direction of the load to be measured in said weighing mechanism; at least one sample container for carrying said sample supported by said support bar at its outer end remote from said weighing mechanism; a tube laterally extending from said casting so as to cover said support bar with said sample container; and means for causing in said sample in said sample container a physical or chemical action which causes changes in the weight of said sample.

11. Apparatus for measuring changes in the weight of a sample as defined in claim 10, in which said means is a heating or cooling device.

12. Apparatus for measuring changes in the weight of a sample as defined in claim 11, in which said sample container is provided with a thermocouple for detecting a change in the temperature of said sample in said sample container.

13. Apparatus for measuring changes in the weight of a sample comprising a weighing mechanism including a sample loading member; a casing enclosing said weighing mechanism, an elongated support bar attached to said sample loading member and laterally extending from said sample loading member in a direction substantially perpendicular to the direction of the load to be measured in said weighing mechanism; at least one sample container for carrying said sample supported by said support bar at its outer end remote from said weighing mechanism; a tube laterally extending from said casing so as to cover said support bar with said sample container; and means for applying radiation to said sample in said sample container and means for detecting radiation from said sample.

References Cited
UNITED STATES PATENTS

| | | | |
|---|---|---|---|
| 201,984 | 4/1878 | Berst | 177—256 XR |
| 401,428 | 4/1889 | Gipperich | 73—432 |
| 779,873 | 1/1905 | Sargent | 177—197 |
| 2,244,507 | 6/1941 | Thomas | 88—14 |
| 2,459,618 | 1/1949 | Cartier | 73—432 XR |
| 2,622,438 | 12/1952 | Campbell | 73—76 |
| 3,061,027 | 10/1962 | Berge et al. | 177—194 |

LOUIS R. PRINCE, Primary Examiner

HARRY C. POST III, Assistant Examiner

U.S. Cl. X.R.

73—15.4; 177—253